July 17, 1951 C. J. PETERSON 2,561,069
BALED HAY FEEDING DEVICE
Filed Jan. 21, 1944 3 Sheets-Sheet 1

INVENTOR
C. J. Peterson
ATTYS

July 17, 1951  C. J. PETERSON  2,561,069
BALED HAY FEEDING DEVICE
Filed Jan. 21, 1944   3 Sheets-Sheet 2
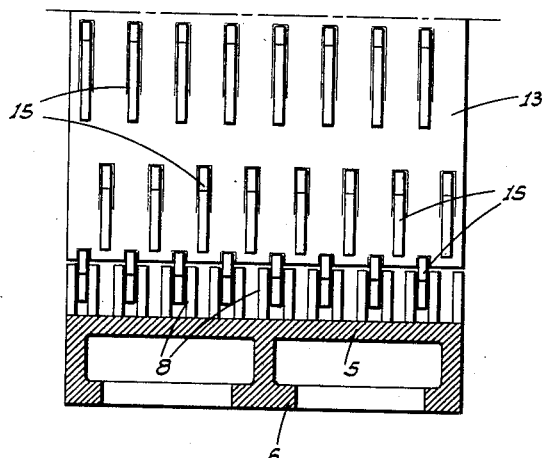
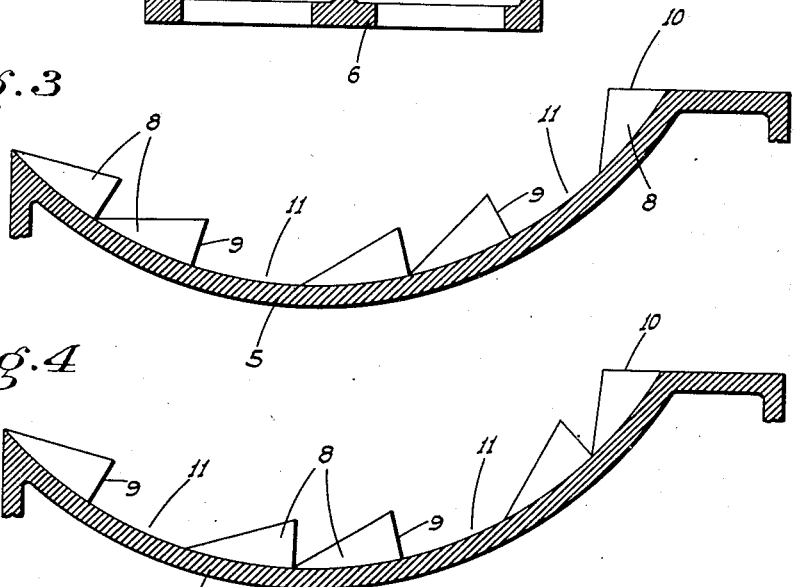
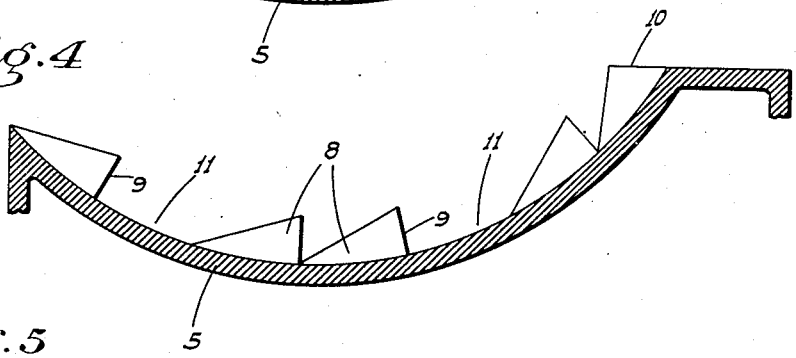
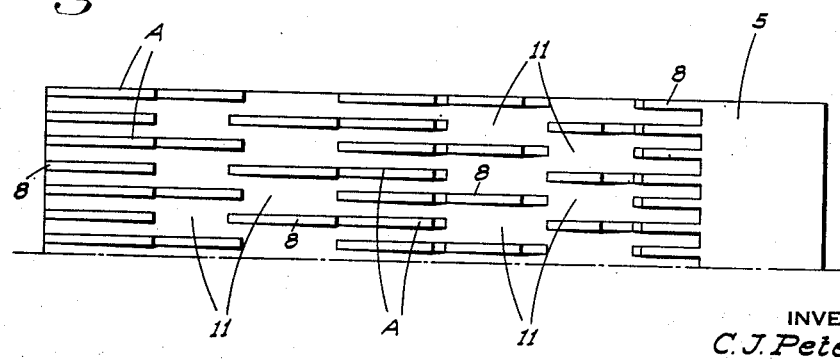
INVENTOR
C. J. Peterson
BY
ATTYS July 17, 1951  C. J. PETERSON  2,561,069
BALED HAY FEEDING DEVICE
Filed Jan. 21, 1944  3 Sheets-Sheet 3

INVENTOR
C. J. Peterson
BY
ATTYS

Patented July 17, 1951

2,561,069

UNITED STATES PATENT OFFICE 2,561,069

BALED HAY FEEDING DEVICE

Clarence J. Peterson, Kingsburg, Calif., assignor to Kingsburg Cotton Oil Co., Kingsburg, Calif., a corporation of California Application January 21, 1944, Serial No. 519,166

5 Claims. (Cl. 198—162)

This invention relates to, and it is an object to provide, a power driven machine which is operative to effectively and readily separate or disintegrate hay bales preparatory to passage of the resultant loose hay through a feed grinding mill for the production of meal.

Another object of the invention is to provide a baled hay separator, as above, which also includes unique means to accomplish a preliminary chopping of the loose hay whereby to facilitate its subsequent treatment or processing in the feed grinding mill.

A further object of the invention is to provide a baled hay separator and chopper which comprises a novel rotor and concave assembly to which the baled hay is automatically, positively, and continuously fed by a power conveyor unit.

It is also an object to provide a power conveyor unit, as in the preceding paragraph, which includes a pair of endless, parallel conveyors arranged in spaced relation in a conveying trough; one of said conveyors being mounted for floating movement relative to the other conveyor whereby to accommodate bales of varying sizes.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a fragmentary transverse view of the rotor and concave assembly and adjacent portion of the conveyor trough.

Figure 3 is an enlarged fragmentary sectional elevation of the concave, illustrating one circumferential row of teeth thereof.

Figure 4 is a similar view but showing an adjacent circumferential row of the teeth thereof.

Figure 5 is a fragmentary plan view of the concave.

Figure 1:
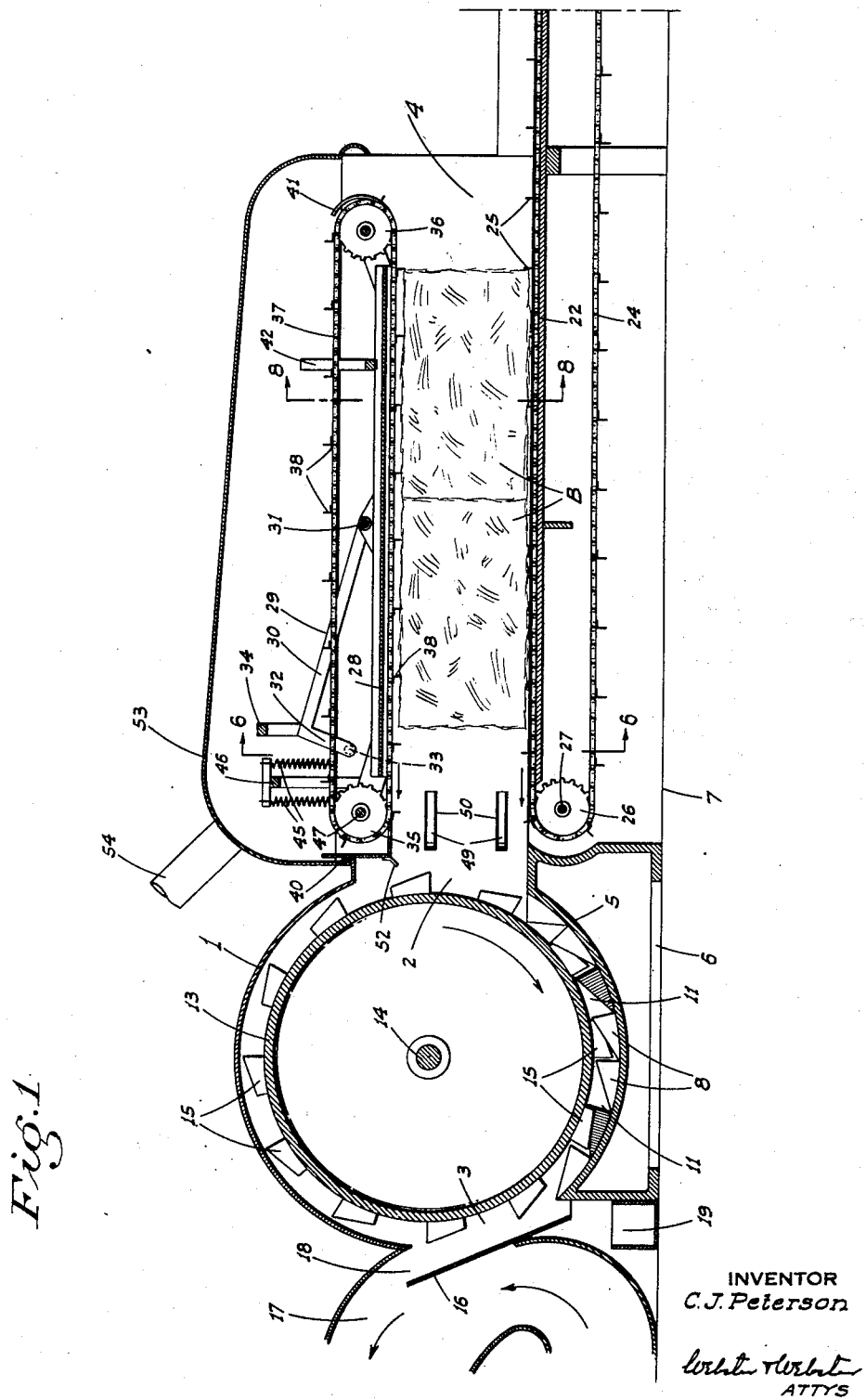
Figure 1 is a sectional elevation of the baled hay separator and chopper.
Figure 6:
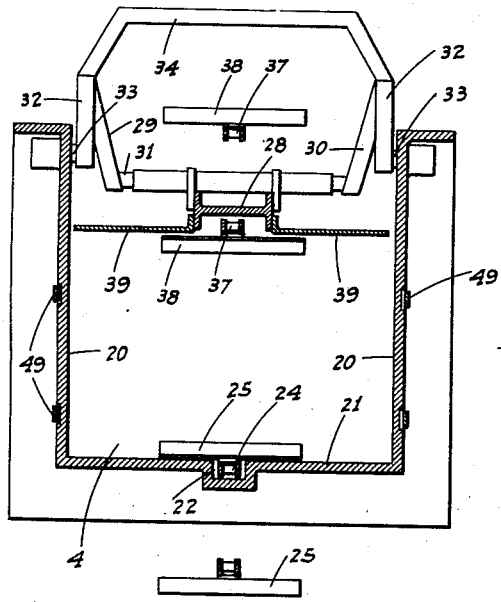
Figure 6 is an enlarged cross section on line 6—6 of Fig. 1.

Referring now more particularly to the characters of reference on the drawings, the numeral 1 indicates an internally cylindrical housing disposed with its axis horizontal, said housing having a rectangular intake opening 2 in one side thereof, and a rectangular discharge opening 3 in the other side thereof, both openings being disposed intermediate the top and bottom of the housing. The opening 2 is of a size to permit the passage of a hay bale B endwise therethrough from a horizontal conveyor trough 4 which is secured at one end to housing 1 in register with said opening 2. The trough 4 and driven conveyors therein are hereinafter described in detail.

The bottom of housing 1, between openings 2 and 3, is in the form of a concave 5 having a base 6 suitably mounted on and supported from the floor 7. The concave 5 includes a plurality of circumferentially extending, transversely spaced rows A of inwardly projecting teeth 8; the teeth being flat, generally triangular shaped and disposed with their edges lengthwise of the corresponding row. The leading edges 9 of said teeth are substantially radial of the concave, except the leading edge 10 of the tooth immediately adjacent opening 2, which edge 10 is parallel to and alined with the bottom of trough 4.

Between the endmost teeth, each row includes two circumferentially spaced gaps 11; said gaps being staggered relative to each other in adjacent rows of teeth as shown in Figs. 3 and 4.

A heavy-duty, cylindrical rotor 13 is fixed on a driven axle 14 in housing 1 with the periphery of said rotor running in clearance relation thereto. A plurality of transverse rows of outwardly projecting teeth 15, similar to teeth 8, are provided on rotor 13; said teeth being positioned to pass in close cooperating relation between the rows A of the concave teeth 8, and corresponding ones of the teeth 15 in adjacent rows are staggered relative to each other axially of the rotor, as shown in Fig. 2.

An upwardly inclined baffle plate 16 is disposed in facing relation adjacent but outwardly of discharge opening 3; such plate 16 projecting into a suction conduit 17 and therewith forming a throat 18 at the upper end of said plate in communication with opening 3. The lower end of plate 16 extends downwardly in spaced relation from the rear end of the concave into a catch bin 19.

The hay bale conveyor unit arranged in trough 4 comprises the following:

The horizontal trough 4 is initially open on top and includes sides 20 and a bottom 21. The bottom 21 is formed with a central, longitudinal groove 22 in which the upper run of an endless chain conveyor 24 rides; such conveyor 24 including cross cleats 25 which ride bottom 21 when in said upper run. Adjacent and below the discharge end of trough 4, conveyor 24 engages about a drive sprocket 26 mounted on a driven transverse shaft 27; the bottom 21 having an opening for the passage of the chain and cleats. The trough 4 is supported above the floor 7 so that the lower run of conveyor 24 merely passes beneath said trough, and said conveyor 24 is extended in suitably supported relation beyond the receiving end of the trough to the extent necessary for loading.

As is obvious, baled hay B will be carried along in the trough 4 by conveyor 24, but to assure a positive feed, the following floating or self-adjusting top conveyor unit is also employed:

A longitudinally extending beam 28 of H-shape in cross section is disposed in the trough 4 a substantial distance above the floor 21 and is vertically swingably supported by a swing frame or yoke 29 having transversely spaced legs 30 pivotally connected to beam 28 by a cross shaft 31 disposed substantially centrally between the ends of said beam. From the shaft 31 the legs 30 extend at a forward and upward incline, to downturned portions 32 which are pivotally connected as at 33 to the sides 20 of the trough adjacent the upper edge of the latter, and adjacent the forward end of beam 28. An arch 34 rigidly connects legs 30, forming therewith an integral frame or yoke.

Sprockets 35 and 36 are journaled in connection with the ends of beam 28 and carry an endless chain 37 having cross cleats 38 fixed thereon; the lower run of said chain in the lower open portion of said beam with the cleats 38 riding against a plate 39 secured on the beam at the bottom, said plate being slotted lengthwise centrally for the passage of the connecting elements between the chain and cleats. At its forward end portion, which is suitably slotted for the passage of cleats 38 therethrough, the plate 39 extends somewhat beyond sprocket 35 and is formed with an upstanding end wall which forms a movable closure 40 for the upper part of opening 2. At the other end, the plate includes upwardly curved guide plates 41 which serve to guide hay bales B under the corresponding end of the top conveyor unit.

A stop member 42 including divergent arms 43 formed with fingers 44 is secured to the top conveyor unit adjacent its intake end and limits downward swinging thereof, whereby to maintain a predetermined minimum spacing between bottom 21 and plate 39. The other end of the top conveyor unit is connected with counterbalancing compression springs 45 which depend from frames 46 upstanding from the adjacent spring mounting members to the top flanges of the sides 20 of trough 4.

Figure 7:
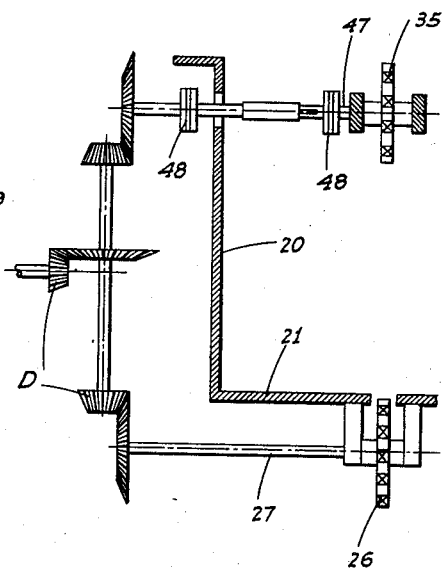
Figure 7 is a diagrammatic elevation of the drive for the power conveyor unit.
Figure 8:
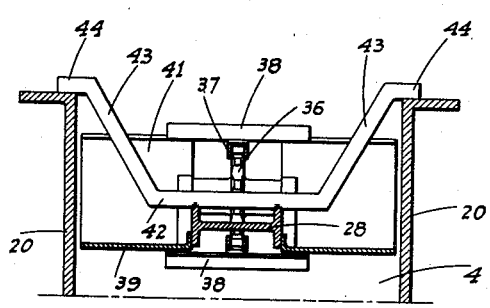
Figure 8 is an enlarged cross section on line 8—8 of Fig. 1.
Figure 9:
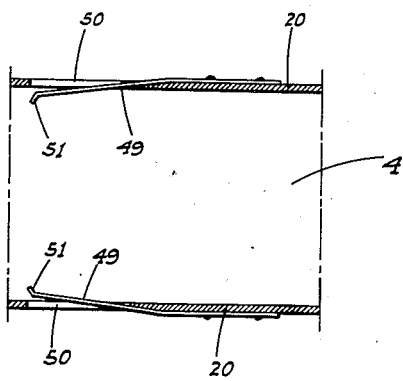
Figure 9 is a fragmentary sectional plan of the conveyor trough showing the spring, hold-back arms which engage the bales at the sides.

The sprocket 35 of the top conveyor unit is carried on a drive shaft 47 which is parallel to but spaced above the drive shaft 27 on which the drive sprocket 26 of the lower conveyor unit is mounted. The shafts 27 and 47 project laterally to terminations at their outer ends beyond the trough, as clearly shown in Fig. 7, and these shafts are driven in opposite directions and so as to slowly advance the adjacent runs of chains 24 and 37 at the same speed. A common drive means is employed, and which is shown diagrammatically at D. The shaft 47 passes through an opening in the adjacent side of the trough and has a pair of spaced universal couplings 48 interposed therein to permit of the necessary rising and falling movement of the top conveyor unit.

Operation

In operation of the above described baled hay separator and chopper, baled hay, after cutting and removal of the retaining wires, is placed on the upper run of the bottom conveyor unit 24 at a point somewhat in advance of the trough 4, such bales being continuously fed in end to end relation into said trough. As the bales enter the trough they pass beneath and are engaged by the lower run of the top conveyor unit. Thus, as the bales pass through the trough they are positively advanced by both bottom and top conveying means, the latter floating and accommodating itself to variations in the height of the bales.

As the lead bale reaches the discharge end of the trough, it is fed slowly but positively through opening 2 in the housing 1 and into contact with the teeth 15 of rotor 13, which is driven at relatively high speed. The teeth 15 quickly and effectively strip apart the lead bale as it advances and sweep the stripped away or loosened hay downward into the concave 5. The cooperative action of teeth 15 of the rotor and teeth 8 of the concave is such as to macerate or chop the hay into relatively small pieces. The staggering of the gaps 11 between adjacent circumferential rows of teeth 8 of the concave 5 is advantageous in that it permits a certain zig-zag cross flow of the hay during the chopping operation, and which zig-zag cross flow materially expedites such chopping of the hay.

After the hay has passed through the concave under the influence of the toothed rotor, the chopped hay is discharged through opening 3 and impinges against the upwardly and outwardly inclined baffle plate 16; suction in the throat 18 from suction conduit 17 carrying the chopped hay into said conduit, and from which it is delivered to the feed grinding mill. Any relatively heavy foreign objects, such as pieces of metal or the like which may pass through the concave from the hay bale, fall from the plate 16 into the catch bin 19.

In order to prevent the lead bale from being drawn into engagement with the toothed rotor too rapidly, pairs of vertically spaced hold-back springs 49 are fixed in connection with the sides 20 of the trough adjacent opening 2; said hold-back springs projecting into the trough through slots 50 in the sides of the latter. Such hold-back springs 49 include inturned fingers 51 at their inner ends which grasp or frictionally engage the sides of the lead bale. Also a pair of transversely spaced hold-back fingers 52 are fixed in connection with the lower edge of end wall 40 and extend therefrom at a forward and downward incline to frictionally engage the top of the leading bale.

To carry off undesirable dust, a full length hood 53 is removably mounted on the trough; the forward end portion of said hood being connected in communication with a suction conduit 54.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A device for feeding baled hay comprising mechanism to progressively advance bales of hay, including a lower conveyor on which said bales of hay may rest, an upper conveyor unit normally extending substantially parallel to the lower conveyor to form a rectangular space therebetween of substantially the same cross sectional dimensions of a bale of hay, such upper conveyor unit including a support, a pair of arms pivotally mounted to the support adjacent one end of the unit, such arms then extending to a point substantially midway of the length of the unit, the unit being pivotally mounted in said arms at such latter point.

2. A device for feeding baled hay comprising mechanism to progressively advance bales of hay, including a lower conveyor on which said bales of hay may rest, an upper conveyor unit normally extending substantially parallel to the lower conveyor to normally form a rectangular space therebetween of substantially the same cross sectional dimensions of a bale of hay, such means including a support on which the unit is floatably suspended to allow it to rise and fall for its full length from its normal position relative to the lower conveyor, the unit being pivoted relative to such suspension means at a point substantially midway of the length of said unit, whereby the latter may have a rocking movement about said pivot in all vertical positions of such unit.

3. A device for feeding baled hay comprising mechanism to progressively advance bales of hay, including a lower conveyor on which said bales of hay may rest, and an upper conveyor unit spaced from the lower conveyor and extending substantially parallel thereto, such upper conveyor unit including a central longitudinal beam, a sprocket mounted at each end of the beam, an endless chain mounted in driven relation about the sprocket, hay bale engaging means on the chain, a support, and means pivotally mounting the beam to the support; said last named means comprising a pair of transversely spaced arms pivoted at one end to the beam at a point substantially centrally of its ends, said arms being elongated and extending at an upward incline from the beam, and means pivoting said arms adjacent their upper ends to the support.

4. A device for feeding baled hay comprising mechanism to progressively advance bales of hay, including a lower conveyor on which said bales of hay may rest, and an upper conveyor unit spaced from the lower conveyor and extending substantially parallel thereto, such upper conveyor unit including a central longitudinal beam, a sprocket mounted at each end of the beam, an endless chain mounted in driven relation about the sprocket, hay bale engaging means on the chain, a support, and means pivotally mounting the beam to the support; said last named means comprising a pair of transversely spaced arms pivoted at one end to the beam at a point substantially centrally of its ends, said arms being elongated and extending at an upward incline from the beam, means pivoting said arms adjacent their upper ends to the support, and means to limit downward movement of the beam.

5. A device for feeding baled hay comprising mechanism to progressively advance bales of hay, including a lower conveyor on which said bales of hay may rest, and an upper conveyor unit spaced from the lower conveyor and extending substantially parallel thereto, such upper conveyor unit including a central longitudinal beam, a sprocket mounted at each end of the beam, an endless chain mounted in driven relation about the sprocket, hay bale engaging means on the chain, a support, and means pivotally mounting the beam to the support; said last named means comprising a pair of transversely spaced arms pivoted at one end to the beam at a point intermediate its ends, said arms being elongated and extending at an upward incline from the beam, means pivoting said arms adjacent their upper ends to the support, and means to limit downward movement of the beam, such limiting means being a stop fixed to one end of the unit and adapted to engage the support, and springs mounted on the support adjacent the other end of the unit, the unit at that end being suspended on said springs.

CLARENCE J. PETERSON.

REFERENCES CITED

The following references are of record in the file of this patent:

UNITED STATES PATENTS

| Number | Name | Date |
|---|---|---|
| 89,669 | Lee | May 4, 1869 |
| 194,776 | Hull | Sept. 4, 1877 |
| 887,693 | Richmond | May 12, 1908 |
| 906,670 | Wise et al. | Dec. 15, 1908 |
| 1,004,126 | Williams et al. | Sept. 26, 1911 |
| 1,028,739 | Kibot | June 4, 1912 |
| 1,143,106 | Davies et al. | June 15, 1915 |
| 1,296,485 | Dick | Mar. 4, 1919 |
| 1,481,152 | Rehbein | Jan. 15, 1924 |
| 1,574,164 | Oppenheim | Feb. 23, 1926 |
| 1,624,703 | Witte | Apr. 12, 1927 |
| 1,925,394 | Holland-Letz | Sept. 5, 1933 |
| 2,163,833 | Eissmann | June 27, 1939 |
| 2,301,088 | Stahl | Nov. 3, 1942 |
| 2,314,605 | Arnold | Mar. 23, 1943 |

FOREIGN PATENTS

| Number | Country | Date |
|---|---|---|
| 303,178 | Germany | Jan. 26, 1918 |